United States Patent [19]

Imada et al.

[11] Patent Number: 4,550,348

[45] Date of Patent: Oct. 29, 1985

[54] VIDEO DISC PLAYER SKIP/ARM SERVO SYSTEM

[75] Inventors: Yosinobu Imada; Akio Nakashima, both of Yokohama, Japan

[73] Assignee: Hitachi, Ltd., Tokyo, Japan

[21] Appl. No.: 544,115

[22] Filed: Oct. 20, 1985

[30] Foreign Application Priority Data

Oct. 20, 1982 [JP] Japan .................................. 57-182818

[51] Int. Cl.$^4$ ......................... H04N 5/76; G11B 21/10
[52] U.S. Cl. .................................... 358/342; 358/907; 369/43
[58] Field of Search ................. 358/342, 907; 369/43, 369/44, 45, 46, 111, 275, 126

[56] References Cited

U.S. PATENT DOCUMENTS

| | | | |
|---|---|---|---|
| 4,106,058 | 8/1978 | Romeas et al. | 369/111 |
| 4,236,232 | 11/1980 | Jansen et al. | 369/44 |
| 4,239,942 | 12/1980 | Van Alem et al. | 369/44 |
| 4,371,959 | 2/1983 | McGuffin | 369/43 |
| 4,432,082 | 2/1984 | Hsieh et al. | 369/44 |
| 4,482,992 | 11/1984 | Shimizu et al. | 358/907 |

Primary Examiner—Donald McElheny, Jr.
Attorney, Agent, or Firm—Antonelli, Terry & Wands

[57] ABSTRACT

A video disc player comprising an arm servo system having means for driving a pickup arm with a cartridge mounted thereon to move in parallel with the surface of a disc, and a kicker drive system for driving a stylus tip mounted on the cartridge to be kicked on the basis of the information from a picture signal processing circuit of the pickup upon special reproduction, wherein when the width of a kicker drive pulse in the kicker drive system exceeds a predetermined value, the drive means of the arm servo system is driven to change the balance position of the stylus tip on the surface of the disc.

1 Claim, 4 Drawing Figures ions 4,550,348

VIDEO DISC PLAYER SKIP/ARM SERVO SYSTEM

This invention relates to a video disc player.

The operation of a conventional video disc player will be described briefly with reference to FIGS. 1 and 2.

FIG. 1 is a schematic top view of the arrangement of a conventional video disc player, and FIG. 2 is a detailed block diagram of a control circuit in FIG. 1.

Referring to FIG. 1, there are shown a video disc 1, a pickup arm 2, a cartridge 3, a stylus tip 4, an arm drive motor 5, an arm drive line 6, a lifter 7, a lifter drive line 8, a kicker 9, a kicker drive line 10, a picture signal processing circuit 11 of the pickup, an output line 12 of the picture signal processing circuit of the pickup, a lead-in position sensor 13, an output 14 of the lead-in sensor, and a control circuit 15.

In FIG. 2, there are shown a track number extracting section 31, a kicker circuit section 32, a kicker output circuit section 33, a lifter circuit section 34, and an arm drive circuit section 35.

When the arm drive motor 5 is supplied with a drive output through the drive line 6 from the arm drive circuit section 35 of the control circuit 15, the arm drive motor 5 drives the pickup arm 2 including the cartridge 3 and so on, to move in the arrow-Y direction. When the arm 2 moves and reaches a predetermined position above the disc 1, the lead-in position sensor 13 detects the arrival of the arm 2 at the predetermined position and sends the lead-in sensor output 14 to the arm drive circuit section 35, thereby stopping the arm 2 from being driven by the motor 5. Then, the lifter circuit section 34 is also supplied with the lead-in sensor output 14 from the sensor 13 and thereby starts to send a drive output through the drive line 8 to the lifter 7, which then causes the stylus tip 4 to land on the surface of the disc 1.

After the landing of the stylus tip 4 on the disc 1, the stylus tip 4 is detected in its position by a stylus-tip position detecting circuit not shown, and then normally shifted.

The operation of the disc player for special reproduction such as still picture reproduction will be described. In the special reproduction mode, the output of the picture signal processing circuit 11 of the pickup 2 is applied through the output line 12 to the track number extracting section 31 of the control circuit 15, and then the track number at the current position of the stylus tip 4 is applied therefrom to the kicker circuit section 32. The kicker circuit section 32 then actuates the kicker output circuit 33 to send a drive output through the kicker drive line 10 to the kicker 9, thereby causing the stylus tip 4 to be kicked. This drive output is a pulse signal the duration of which changes in proportion to the required amount of kicking of the stylus tip 4. The video disc player mentioned above was published in, for example, Japanese Patent Laid-Open No. 158066/1982 Specification.

Thus, the conventional video disc player has separately provided an arm servo system including means for driving the pickup arm with cartridge to move in parallel with the disc surface, and a kicker drive system for causing the stylus tip mounted on the cartridge to be kicked on the basis of the information from the picture signal processing circuit of the pickup upon special reproduction. FIG. 3 is a rearranged block diagram of the above conventional video disc player.

In FIG. 3, the arm servo system is formed by a stylus tip position detecting circuit 51, a drive signal generating circuit 52 (corresponding to the arm drive circuit section 35 in FIG. 2), and an arm mechanism drive circuit 53 (corresponding to the arm drive motor 5 in FIG. 1).

On the other hand, the kicker drive system is formed by a video circuit 54 (corresponding to the picture signal processing circuit 11 in FIG. 1), a frame number decoder 55 (corresponding to the track number extracting portion 31), a kicker pulse amplitude control arithmetic circuit 56 (corresponding to the kicker circuit section 32 in FIG. 2), and a stylus drive kicker circuit (corresponding to the kicker 9 in FIG. 1).

As shown in FIG. 3, the conventional video disc player has separate arm servo system and kicker drive system which are closely related to each other but are independently controlled, and hence it has the following disadvantage.

Although, since the arm servo system controls the stylus tip to normally shift, the precision of working the cartridge (such as the suspension precision of cantilever and mounting precision of flylead to the stylus tip) may be relatively low, the kicker drive system for special reproduction needs relatively high precision of working the cartridge. In other words, even if the width of the kicker pulse from the kicker pulse width control arithmetic circuit 56 becomes large, the stylus tip must be precisely kicked in proportion to that pulse width. In practice, however, it is difficult to produce such a cartridge as has a precision with which the stylus tip can be kicked precisely in proportion to the pulse width larger than a limit. This results in low yield of cartridge production.

It is an object of this invention to provide a video disc player capable of improving the yield of the cartridge production.

Thus, according to this invention, there is provided a video disc player in which when the width of the pulse from the kicker pulse width control arithmetic circuit in the kicker drive system is increased over a constant limit and the stylus tip drive kicker circuit cannot follow this width, i.e., when the pulse width output from the kicker circuit exceeds a predetermined value, the arm mechanism drive circuit in the arm servo system is driven to change the balanced position of the arm servo, and move the stylus tip.

The invention will become more readily understood from the following exemplary descriptions taken with the accompanying drawings, wherein.

One embodiment of this invention will be described with reference to FIG. 4.

Figure 1:
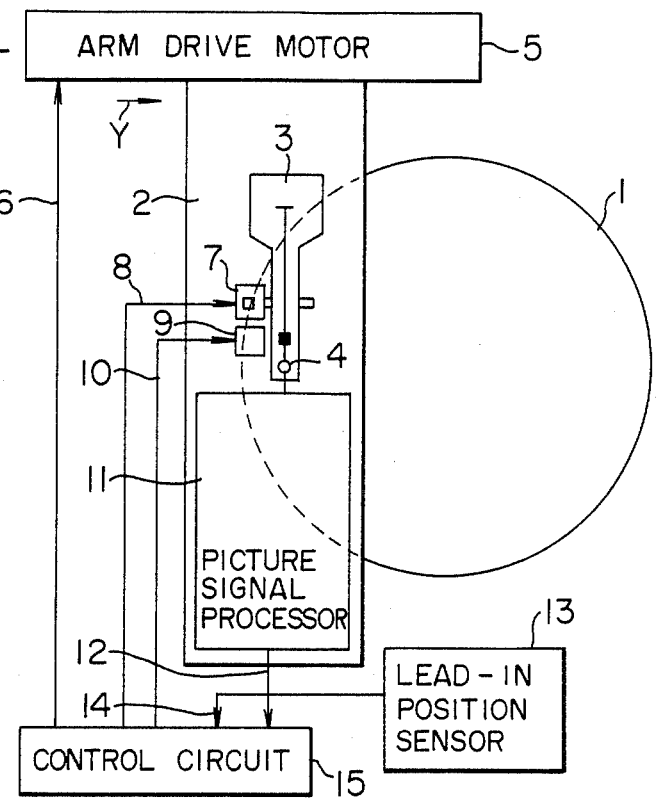
FIG. 1 is a schematic plan view of the arrangement of a conventional video disc player.
Figure 2:
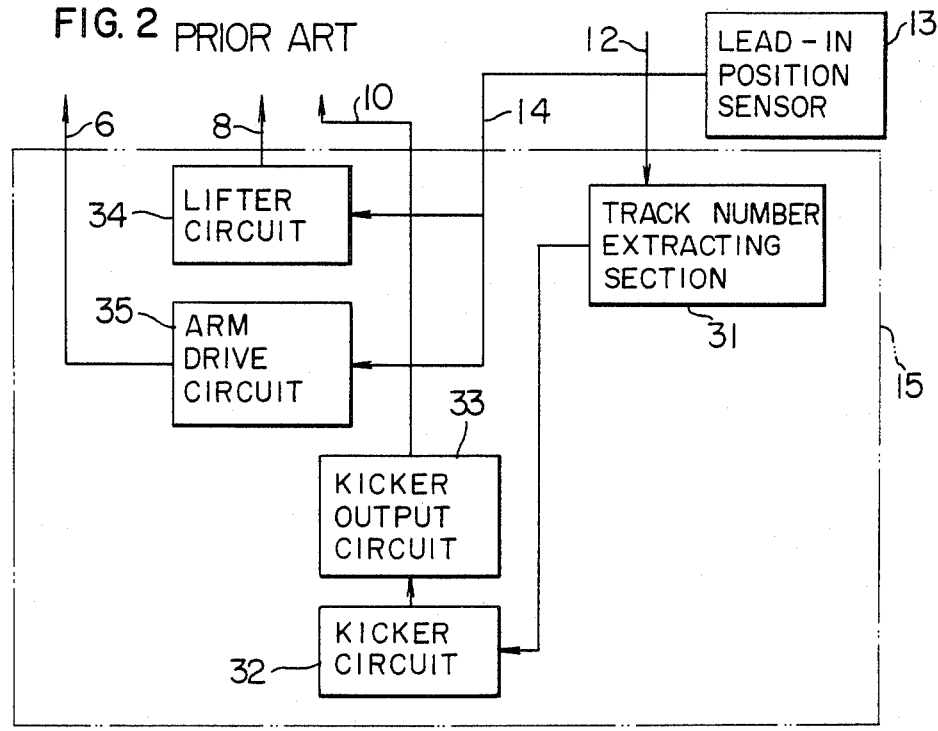
FIG. 2 is a detailed block diagram of the control circuit in FIG. 1.
Figure 3:
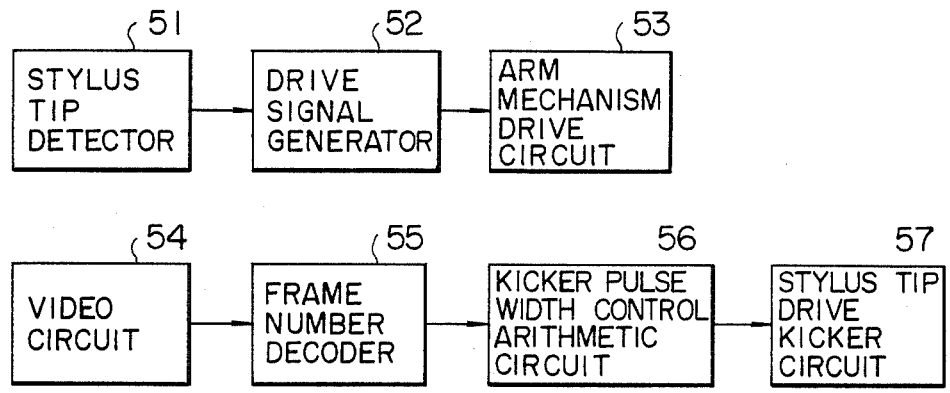
FIG. 3 is a block diagram of the arm servo system and kicker drive system in a conventional video disc player.
Figure 4:
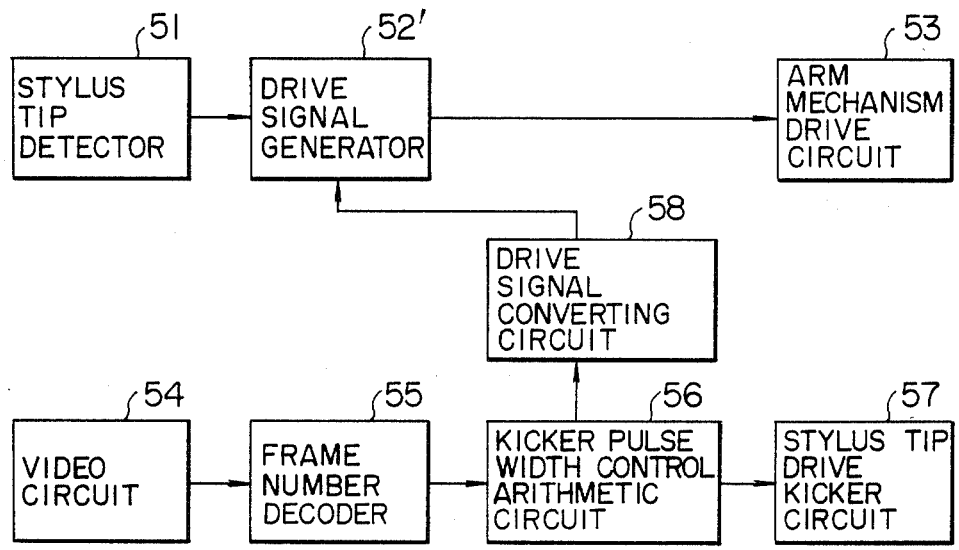
FIG. 4 is a block diagram of one embodiment of this invention.

FIG. 4 is a block diagram of one embodiment of this invention. In FIG. 4, like elements corresponding to those of FIG. 1 are identified by the same reference numerals and will not be described. Reference numeral 58 represents a drive signal converting circuit provided according to this invention. The drive signal converting circuit 58 has an input terminal connected to the kicker pulse width control arithmetic circuit 56, and an output terminal connected to the drive signal generating circuit 52'. The drive signal converting circuit 58 is supplied at its input terminal with the same pulse signal as that supplied to the stylus tip drive kicker circuit 57 from the kicker pulse width control arithmetic circuit 56, and then it supplies a control signal to the drive signal generating circuit 52' when the width of the input pulse signal exceeds a certain limit. The drive signal generating circuit 52' is responsive to the control signal to produce a drive signal for changing the balanced position of the arm servo system, thereby controlling the arm mechanism drive circuit 53. Thus, the arm is moved by the change of the balanced position of the arm servo system. One example of concrete value:

The width of the kicker drive pulse varies in the range from 400 $\mu$s to 1400 $\mu$s. However, the width of the kicker drive pulse became more than 900 $\mu$s, the following characteristic became worse. Accordingly, when the width of the kicker drive pulse became more than 900 $\mu$s, the balanced position of the arm servo system was moved.

When the kicker drive pulse is 1150 $\mu$s, the moving volume is 0.14 mm. When the kicker drive pulse is 1400 $\mu$s, the moving volume is 0.28 mm. The moving direction is the same as the direction of the kicker drive.

According to this invention, even if the cartridge of unsatisfied kicker characteristic produced with poor precision as in the prior art is used, the balance position of the arm servo system is changed when the width of the pulse signal to the kicker circuit exceeds a predetermined value, thereby enabling a desired performance to be obtained. This results in high yield of cartridge production.

We claim:

1. A video disc player comprising an arm servo system having means for driving a pickup arm with a cartridge mounted thereon to move in parallel with the surface of a disc, and a kicker drive system having means for driving a stylus tip mounted on said cartridge to be kicked in proportion to the width of a kicker drive pulse on the basis of the information from a picture signal processing circuit of said pickup arm, said video disc player characterized by the provision of a drive signal converting circuit having an input terminal to which said kicker drive pulse is applied and an output terminal from which a detected output signal is produced when said drive signal converting circuit detects that the width of said kicker drive pulse exceeds a predetermined value, and a drive signal generating circuit having an input terminal connected to said output terminal of said drive signal converting circuit, and which is responsive to said detected output signal to produce a drive signal for changing a balanced position of said stylus tip.

* * * * *